(12) United States Patent
Ylikoski (10) Patent No.: US 8,374,578 B2
(45) Date of Patent: Feb. 12, 2013

(54) METHODS AND APPARATUS FOR CHARGING A SUBSCRIBER ROAMING IN A MOBILE COMMUNICATION NETWORK

(75) Inventor: Martti Ylikoski, Helsinki (FI)

(73) Assignee: Nokia Corporation, Espoo (FI)

( * ) Notice: Subject to any disclaimer, the term of this patent is extended or adjusted under 35 U.S.C. 154(b) by 663 days.

(21) Appl. No.: 11/219,584

(22) Filed: Sep. 1, 2005

(65) Prior Publication Data

US 2007/0004380 A1    Jan. 4, 2007

(30) Foreign Application Priority Data

Jun. 30, 2005   (FI) ..................................... 20050697

(51) Int. Cl.
*H04M 11/00* (2006.01)
*H04W 4/00* (2009.01)
*H04M 15/00* (2006.01)
(52) U.S. Cl. ................. 455/406; 455/432.1; 379/114.2
(58) Field of Classification Search .................. 455/406, 455/432.1
See application file for complete search history.

(56) References Cited

U.S. PATENT DOCUMENTS

| 5,778,313 A * | 7/1998 | Fougnies ...................... 455/406 |
| 6,119,001 A | 9/2000 | Delis et al. .................... 455/433 |
| 6,185,414 B1 * | 2/2001 | Brunner et al. ............... 455/406 |
| 6,226,364 B1 * | 5/2001 | O'Neil ......................... 379/114.2 |
| 6,393,269 B1 * | 5/2002 | Hartmaier et al. ............. 455/406 |
| 6,408,173 B1 * | 6/2002 | Bertrand et al. ............... 455/406 |
| 6,493,551 B1 | 12/2002 | Wang et al. .................... 455/432 |
| 6,792,271 B1 | 9/2004 | Sherman et al. ............. 455/432.1 |
| 7,103,358 B2 * | 9/2006 | Rodriguez et al. ......... 455/432.3 |
| 7,260,409 B2 * | 8/2007 | Hanson ...................... 455/456.1 |
| 2003/0129974 A1 | 7/2003 | Viitala ......................... 455/414 |

FOREIGN PATENT DOCUMENTS

| EP | 1519604 | * | 3/2005 |
| EP | 1519604 A1 | | 3/2005 |

* cited by examiner

*Primary Examiner* — Huy C Ho
(74) *Attorney, Agent, or Firm* — Harrington & Smith (57) ABSTRACT

The invention relates to a solution for charging a subscriber roaming in a mobile communication network. In the invention, a temporary user subscription is created for the roaming subscriber and an account balance is set for the temporary user subscription allowing the subscriber to use services attached to the temporary user subscription while roaming in the packet data based mobile communication network.

15 Claims, 4 Drawing Sheets

METHODS AND APPARATUS FOR CHARGING A SUBSCRIBER ROAMING IN A MOBILE COMMUNICATION NETWORK

TECHNICAL FIELD

The invention relates to communication networks. In particular, the invention relates to charging a subscriber roaming in a mobile communication network in a novel way.

BACKGROUND

Recently mobile communication networks have started to support transmission of packet switched data or packet data in addition to traditional circuit switched data transmission.

An example of a technique allowing packet data transmission for mobile communication networks is General Packet Radio Service (GPRS). GPRS is designed to support e.g. digital mobile telecommunication networks based on the Global System for Mobile Communications (GSM) standard. However, GPRS is not restricted to only GSM networks but may support for example $3^{rd}$ Generation Partnership Project (3GPP) based digital mobile telecommunication networks. Other examples of packet data based mobile communication networks are Wireless Local Area Network (WLAN) based mobile communication networks, Code Division Multiple Access (CDMA) based mobile communications networks, Wideband Code Division Multiple Access (WCDMA) based mobile communications networks, and Enhanced Data Rates for Global Evolution (EDGE) based mobile communication networks.

A GPRS based mobile communication network comprises supplementary network elements or nodes in addition to existing network elements. These include a Serving GPRS Support Node (SGSN) and a Gateway GPRS Support Node (GGSN). A Serving GPRS Support Node typically delivers packets to and from GPRS enabled terminal devices within its service area. A Gateway GPRS Support Node is typically used as an interface to external IP networks such as the Internet, other mobile service providers' GPRS services, or enterprise intranets.

The introduction of packet data based mobile communication networks has resulted in various value-added subscriber services being provided for these packet data based mobile communication networks. Examples of such subscriber services are packet data based voice, email, content downloading, browsing, streaming and rich calls. Furthermore, packet data based mobile communications networks typically offer network services to support the usage of subscriber services. Such network services include e.g. rerouting, barring, accounting, content proxy services, content blocking services, firewall services, virus scanning services, performance enhancement proxy services, Virtual Private Network (VPN) services, various Quality of Service (QoS) related services and various charging related services for both online and offline charging.

A recent trend is to provide the various subscriber and network services for packet data based mobile communications networks in a subscriber specific manner. To allow this, one or more subscription profiles are generated for each subscriber. The subscription profile comprises subscriber specifically customized subscription data that will be utilized in providing the various subscriber and network services to the terminal devices of the subscriber. The subscription data may comprise e.g. authorization information about which access points in the mobile communication network the subscriber is allowed to access, and which services are allowed within each allowed access point. The subscription data may further comprise e.g. information about charging attributes or rules, Quality of Service attributes or rules, and service chaining attributes such as attributes or rules for chained service selection and chained service component specific attributes or rules. An access point may be e.g. a Gateway GPRS Support Node of a General Packet Radio Service based mobile communication network, or a Packet Data Gateway of a Wireless Local Area Network based mobile communication network.

Prior art teaches storing the generated subscription profile in a subscriber database of a home network of the subscriber. As is known in the art, in the context of mobile communication networks, when a subscriber connects via a service area that is managed by an operator other than the one with whom the subscriber originally registered with, the subscriber is said to be "roaming". In contrast, when the subscriber connects via a service area that is managed by the operator with whom the subscriber originally registered with, the subscriber is said to be at "home". The mobile communication network managed by the operator with whom the subscriber originally registered with is called the home network of the subscriber. The subscriber database may be, for example, a Home Location Register in a General Packet Radio Service based mobile communication network.

The prior art solution of storing the generated subscription profile in the subscriber database of the home network of the subscriber works reasonably well while the subscriber is at home.

However, problems arise when the subscriber is roaming. When the terminal device of the subscriber roams into a visited network and requests to use a gateway of the visited network, the gateway needs to acquire the subscription profile of the roaming terminal device. Prior art teaches ways of acquiring the subscription profile. A way involves the gateway of the visited network directly contacting the subscriber database of the home network of the roaming terminal device and requesting the subscription profile of the roaming terminal device. Another way involves the gateway of the visited network first contacting a session control means of the home network of the roaming terminal device and requesting the subscription profile of the roaming terminal device. The session control means in turn contacts the subscriber database of the home network of the roaming terminal device, requests the subscription profile of the roaming terminal device, and forwards relevant parts of the subscription profile to the gateway of the visited network. Yet another way involves the gateway of the visited network contacting the session control means of the visited network, and the session control means of the visited network contacting the subscriber database of the home network and requesting the subscription profile of the roaming terminal device. The session control means is sometimes also referred to as Internet Protocol Session Control, a Policy Decision Function (PDF), a Charging Rules Function (CRF) or a Policy and Charging Control Node (PCCN).

Thus, in the prior art, when the terminal device is roaming and its subscription profile is required, the subscription profile will always have to be transmitted from one network to another, i.e. from the home network to the visited network. This, however, is not desirable. Transmitting the subscription profile from one network to another requires real-time signaling which in turn causes delay. In today's highly loaded mobile communication networks real-time signaling and its associated delay is to be avoided whenever possible. Furthermore, transmitting the subscription profile from one network to another may not even be possible at all times due to e.g. some connection problem between the two networks. Furthermore, the transmission of the subscriber profile from the home network to the visited network is also difficult as international standards need to be agreed and every operator needs to implement them.

SUMMARY OF THE PREFERRED EMBODIMENTS

According to a first aspect of the invention there is provided a method of charging a subscriber roaming in a mobile communication network. The method comprises creating a temporary user subscription for the roaming subscriber, and fetching an account balance for the temporary user subscription allowing the subscriber to use services attached to the temporary user subscription while roaming in the mobile communication network.

According to a second aspect of the invention there is provided a system of charging a subscriber roaming in a mobile communication network. The system comprises a mobile communication network, and a temporary user subscription generator, included in the mobile communication network, configured to create a temporary user subscription for the roaming subscriber and to set an account balance for the temporary user subscription allowing the subscriber to use services attached to the temporary user subscription while roaming in the mobile communication network.

According to a third aspect of the invention there is provided a network element of a mobile communication network. The network element comprises a temporary user subscription generator configured to create a temporary user subscription for the roaming subscriber and to set an account balance for the temporary user subscription allowing the subscriber to use services attached to the temporary user subscription while roaming in the mobile communication network.

According to a fourth aspect of the invention there is provided a network element of a mobile communication network. The network element comprises a first receiver configured to receive a session establishment request from a user terminal, a controller configured to hold the session establishment request, a first transmitter configured to request charging information from the user terminal, a second receiver configured to receive charging information from the user terminal, a second transmitter configured to send a request for a temporary user subscription to a temporary user subscription generator, a third receiver configured to receive a response from the temporary user subscription generator after successful creation of the temporary user subscription, and wherein the controller is configured to continue the session establishment.

According to a fifth aspect of the invention there is provided a network element of a mobile communication network. The network element comprises a first receiver configured to receive a session establishment request from a user terminal, an analyzer configured to identify that the session establishment request comes from a subscriber for which a temporary user subscription has already been created, a first transmitter configured to send a request for the created temporary user subscription to a temporary user subscription generator, a second receiver configured to receive subscription information from the temporary user subscription generator, and a controller configured to apply the created temporary user subscription for the roaming subscriber.

In one embodiment of the invention, the method further comprises receiving a session establishment request at a gateway node of the mobile communication network from a user terminal, holding the session establishment request, sending a request for charging information to the user terminal, receiving charging information from the user terminal, creating the temporary user subscription for the roaming subscriber based on the charging information, and continuing the session establishment after successfully creating the temporary user subscription.

In one embodiment of the invention, the charging information comprises at least one of credit card information and a usage limit.

In one embodiment of the invention, the charging information comprises a sequence printed on a voucher.

In one embodiment of the invention, the method further comprises accessing a web site, entering charging information to the web page, and creating the temporary user subscription for the roaming subscriber based on the charging information.

In one embodiment of the invention, the method further comprises receiving a session establishment request at a gateway node of the mobile communication network from a user terminal, identifying at the gateway node that the session establishment request comes from a subscriber for which a temporary user subscription has already been created, and applying the created temporary user subscription for the roaming subscriber.

According to a sixth aspect of the invention there is provided a computer program embodied on a computer readable medium for storing data content from a data communication network in a remote computer. The computer program comprises code adapted to perform the following steps when executed on a data processing device: creating a temporary user subscription for the roaming subscriber, and setting an account balance for the temporary user subscription allowing the subscriber to use services attached to the temporary user subscription while roaming in the mobile communication network.

According to a seventh aspect of the invention there is provided a computer program embodied on a computer readable medium for storing data content from a data communication network in a remote computer. The computer program comprises code adapted to perform the following steps when executed on a data-processing device: receiving a session-establishment request at a gateway node of a mobile communication network from a user terminal; holding the session establishment request; sending a request for charging information to the user terminal; receiving charging information from the user terminal; sending a request for a temporary user subscription for the roaming subscriber based on the charging information to a charging system, and continuing the session establishment after successfully creating the temporary user subscription.

According to an eighth aspect of the invention there is provided a computer program embodied on a computer readable medium for storing data content from a data communication network in a remote computer. The computer program comprises code adapted to perform the following steps when executed on a data-processing device: receiving a session establishment request at a gateway node of a mobile communication network from a user terminal; identifying at the gateway node that the session establishment request comes from a subscriber for which a temporary user subscription has already been created, and applying the created temporary user subscription for the roaming subscriber.

An advantage of the invention compared to the existing solutions is that the invention does not require any additional communication between the visited network and the home network for enabling content delivery to the terminal requesting the content.

The invention allows avoiding the need to transmit home subscription information from the home network of the roaming terminal device to the visited network. Rather, a temporary user subscription stored in the visited network is used and the temporary user subscription has been provided with a credit to user services. Furthermore, as the user subscription in the visited network is temporary, the user may be properly served even when there are connection problems between the home network and the visited network.

A further benefit of the invention is that there is no need to create additional standards for the solution disclosed in the invention. Therefore, no expensive modifications are required in existing mobile communications networks. Furthermore, the invention allows visited public land mobile network (VPLMN) operators to offer services to roaming subscribers.

In conclusion, the foregoing summary of aspects and embodiments of the present invention is exemplary and non-limiting. For example, one skilled in the art will understand that one or more aspects or steps from one embodiment can be combined with one or more aspects or steps from another embodiment of the present invention to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Reference will now be made in detail to the embodiments of the present invention, examples of which are illustrated in the accompanying drawings.

Figure 1:
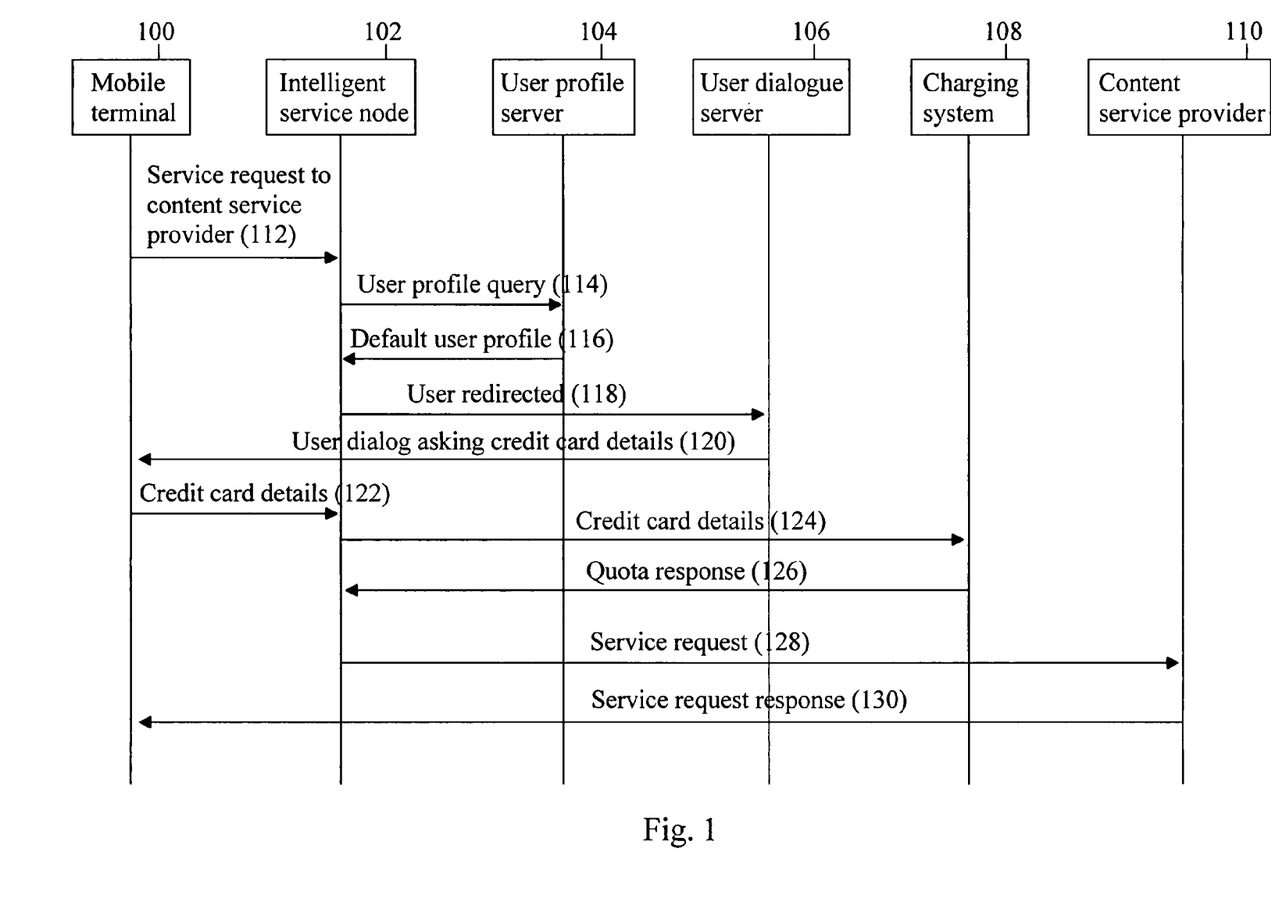
FIG. 1 discloses a signaling diagram illustrating one embodiment of a method according to the invention.

FIG. 1 discloses a signaling diagram illustrating one embodiment of a method according to the invention. In the exemplary embodiment of FIG. 1 a packet-data-based mobile communication network comprises a General Packet Radio service based mobile communication network the packet data transmission of which is based on Internet Protocol (IP). However, the present invention applies as well to e.g., Wireless Local Area Network based mobile communication networks, Code Division Multiple Access based mobile communication networks, Wideband Code Division Multiple Access based mobile communication networks, and Enhanced Data Rates for Global Evolution based mobile communication networks.

In the embodiment of FIG. 1, a user is roaming with his terminal in a General Packet Radio Service based mobile communication network. When the mobile terminal sends a service request to a service provider, the request is routed (step 112) to an intelligent service node 102. The service request refers e.g., to a Packet Data Protocol (PDP) context activation. The intelligent service node queries (step 114) from a user profile server 104 a user profile for the user. Since the International Mobile Subscriber Identity (IMSI) is a foreign one, a default user profile is used for the user. The default user profile defines e.g. which services are available for the user and the charging of these services. The user profile server 104 sends (step 116) the default user profile to the intelligent service node 102.

In the above, the intelligent service node 102 trapped the user session. The intelligent service node 102 redirects (step 118) the user to a user dialogue server 106 and a dialogue asking for a credit number is presented to the user of the mobile terminal 100 (step 120). The user enters the credit card details (credit card number and a money amount to use) and a response message is sent (step 122) back to the intelligent service node 102. Credit card details are sent (step 124) to a charging system 108. The charging system 108 may perform a credit card check. Furthermore, the charging system 108 creates a temporary account for the user, sets the account balance based on the given amount and sends (step 126) a response message to the intelligent service node 102. The response message comprises e.g. the amount of quota for the user.

After receiving the response message, the intelligent network node 102 redirects (step 128) the user to the content service provider 110. The content service provider 110 provides (step 130) the requested service to the mobile terminal 100. If a credit limit is reached while providing service to the mobile terminal 100, the intelligent service node 102 e.g. sends a new dialogue to the mobile terminal asking a permission to continue charging until a next credit limit is reached. In this way the user is kept informed and is in control of the expenditure.

For protocols not supporting session trapping (e.g. streaming etc.), the user session is blocked and a message, e.g. a short message, with address to a subscription portal is sent to the mobile terminal.

Figure 2:
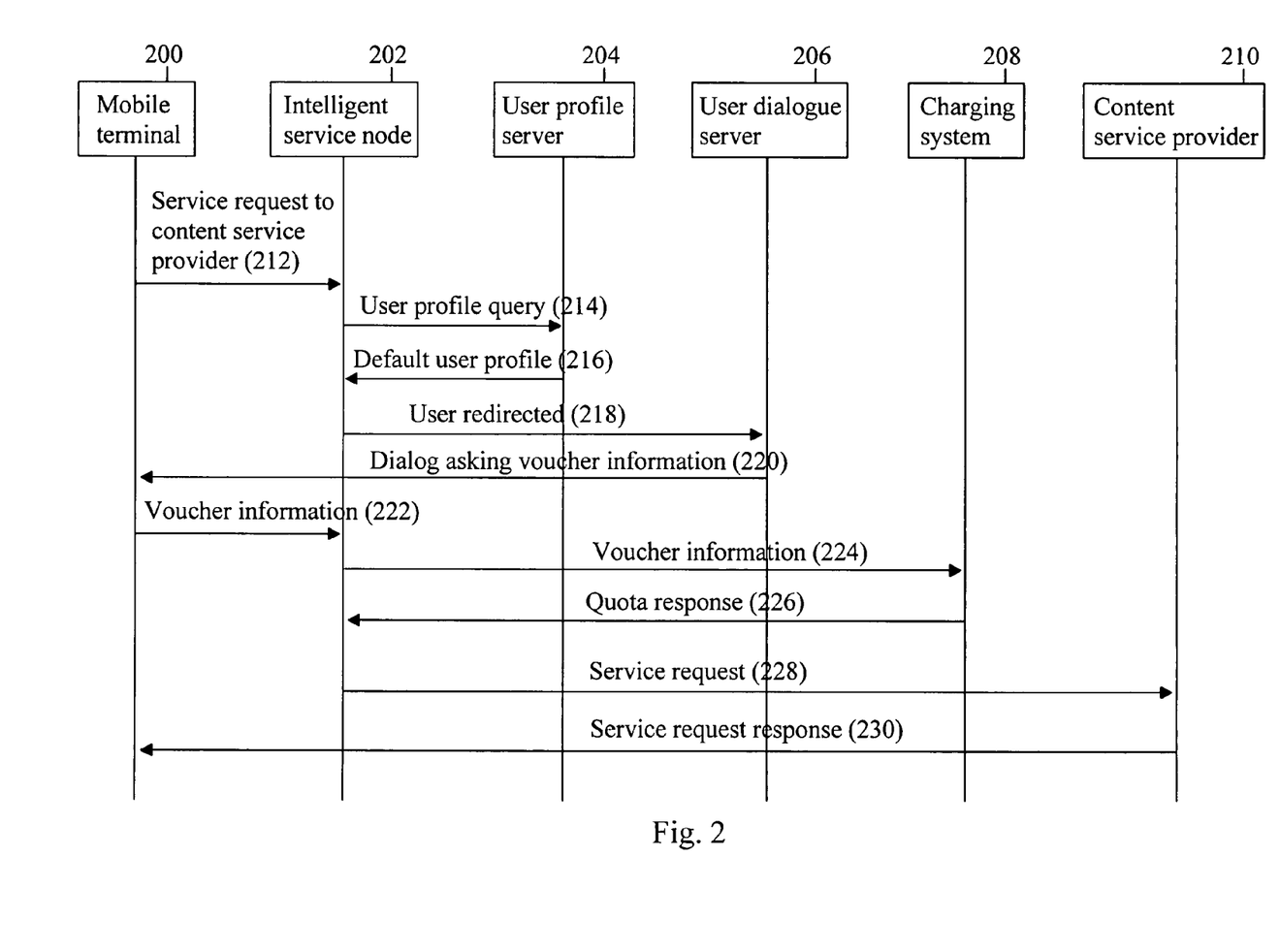
FIG. 2 discloses a signaling diagram illustrating another embodiment of a method according to the invention.

FIG. 2 discloses a signaling diagram illustrating another embodiment of a method according to the invention. In the exemplary embodiment of FIG. 2 a packet data based mobile communication network comprises a General Packet Radio Service based mobile communication network the packet data transmission of which is based on Internet Protocol (IP). However, the present invention applies as well to e.g. Wireless Local Area Network based mobile communication networks, Code Division Multiple Access based mobile communication networks, Wideband Code Division Multiple Access based mobile communication networks, and Enhanced Data Rates for Global Evolution based mobile communication networks.

In the embodiment of FIG. 2, a user is roaming with his terminal 200 in a General Packet Radio Service based mobile communication network. However, the user has bought a voucher e.g. from a local kiosk. The voucher refers e.g. to prepaid voucher that gives the user a certain amount of credit to use some services. When the mobile terminal 200 sends a service request to a service provider 210, the request is routed (step 212) to an intelligent service node 202. The service request refers e.g. to a Packet Data Protocol (PDP) context activation. The intelligent service node queries (step 214) from a user profile server 204 a user profile for the user. Since the International Mobile Subscriber Identity (IMSI) is a foreign one, a default user profile is used for the user. The default user profile defines e.g. which services are available for the user and the charging of these services. The user profile server 204 sends (step 216) the default user profile to the intelligent service node 202.

In the above, the intelligent service node 202 trapped the user session. The intelligent service node 202 redirects (step 218) the user to a user dialogue server 206 and a dialogue asking for voucher information is presented to the mobile terminal 200 (step 220). The user enters the voucher information (e.g. the sequence printed on the voucher) and a response message is sent (step 222) back to the intelligent service node 202. The voucher information is sent (step 224) to a charging system 208. The charging system 208 activates the voucher, creates a temporary account for the user, sets the account balance based on the voucher information and sends (step 226) a response message to the intelligent service node 202. The response message comprises e.g. the amount of quota for the user.

After receiving the response message, the intelligent service node 202 redirects (step 228) the user to the requested content service provider 210. The content service provider 210 provides (step 230) the requested service to the mobile terminal 200. In one embodiment, if the voucher limit is reached while providing service to the mobile terminal 200, the intelligent service node 202 sends a new dialogue to the mobile terminal asking for new voucher information. In another embodiment, the user of the mobile terminal 200 may be provided a message that the voucher has been consumed.

For protocols not supporting session trapping (e.g. streaming etc.), the user session is blocked and a message, e.g. a short message, with address to a subscription portal is sent to the mobile terminal.

Figure 3:
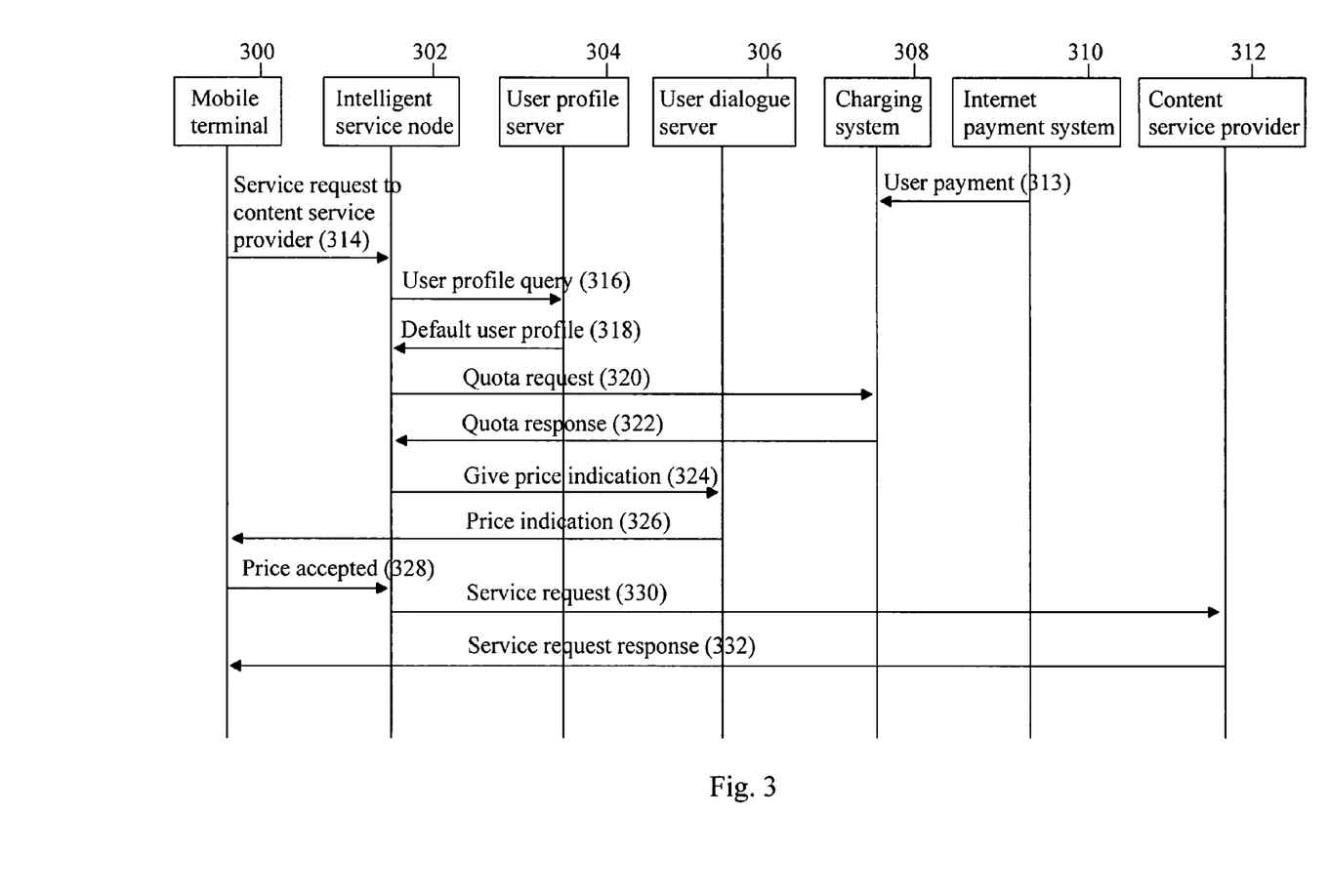
FIG. 3 discloses a signaling diagram illustrating one embodiment of a method according to the invention.

FIG. 3 discloses a signaling diagram illustrating one embodiment of a method according to the invention. In the exemplary embodiment of FIG. 3 a packet data based mobile communication network comprises a General Packet Radio Service based mobile communication network the packet data transmission of which is based on Internet Protocol (IP). However, the present invention applies as well to e.g. Wireless Local Area Network based mobile communication networks, Code Division Multiple Access based mobile communication networks, Wideband Code Division Multiple Access based mobile communication networks, and Enhanced Data Rates for Global Evolution based mobile communication networks.

In the embodiment of FIG. 3, a user is roaming with his terminal 300 in a General Packet Radio Service based mobile communication network. However, the user has previously accessed an Internet portal provided by one of the operators in that particular country in which the user is now roaming. The user provides the portal with adequate amount of information (e.g. credit card number, the amount, user information etc.). The Internet portal charges the user and provides (step 313) a charging system 308 of the mobile communication network with user payment information (e.g. the charged amount, user information etc.). Based on the user payment information the charging system 308 creates a temporary account for the user, sets the account balance based on the already charged amount.

When the mobile terminal 300 sends a service request to a service provider 312, the request is directed (step 314) to an intelligent service node 302. The service request refers e.g. to a Packet Data Protocol (PDP) context activation. The intelligent service node queries (step 316) from a user profile server 304 a user profile for the user. Since the International Mobile Subscriber Identity (IMSI) is a foreign one, a default user profile is used for the user. The default user profile defines e.g. which services are available for the user and the charging of these services. The user profile server 304 sends (step 318) the default user profile to the intelligent service node 302.

In the above, the intelligent service node 302 trapped the user session. The intelligent service node 302 identifies that the request comes from a user (mobile terminal) to which a temporary account has already been created. Moreover, a service profile may tell that the service requires price indication (e.g., if the price of some chargeable content is larger than some given value). Moreover, in one embodiment, the service profile may always require price indication or some other warning dialogue (telling e.g. about the privacy policy of the service in question). Furthermore, the user profile may also tell that the user requires price indication. The intelligent service node 302 sends (step 320) a quota request to the charging system 308, and in response to the quota request, the charging system 308 sends (step 322) a quota response back to the intelligent service node 302.

Since the user profile indicated that the user must be provided with price indication, the user is redirected (step 324) to a user dialogue server 306, which provides (step 326) the user with price indication. If the user accepts (step 328) the price indication, the intelligent service node 302 redirects (step 330) the user request to the content service provider 312. The content service provider 312 provides (step 332) the requested service to the mobile terminal 300.

Figure 4:
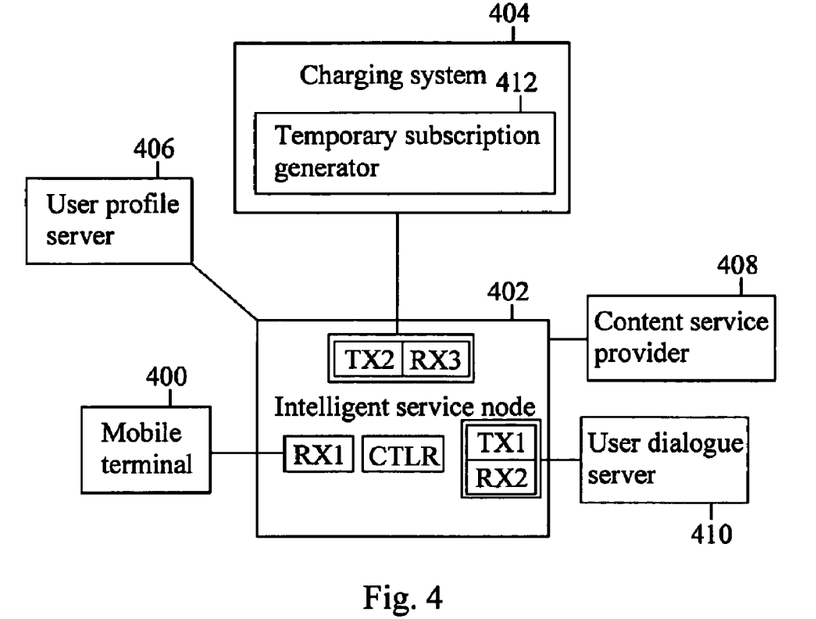
FIG. 4 discloses one embodiment of a system according to the invention.

FIG. 4 discloses an embodiment of a system according to the invention. The system comprises a packet data based mobile communication network comprising a mobile terminal 400 that requests service from a content service provider 408 via an intelligent service node 402. The intelligent service node 402 refers e.g. to a Gateway GPRS Support Node that implements the functionality of the invention.

The intelligent service node 402 comprises a first receiver RX1 configured to receive a session establishment request from the mobile terminal 400, a controller CTRL configured to hold the session establishment request, a first transmitter TX1 configured to request charging information from the mobile terminal 400 and a second receiver RX2 configured to receive charging information from the mobile terminal 400. The charging information is received e.g. via a user dialogue server 410. The intelligent server node 402 further comprises a second transmitter TX2 configured to send a request for a temporary user subscription to a charging system 404 and a third receiver RX3 configured to receive a response from the charging system 404 after successful creation of the temporary user subscription. The controller CTRL is configured to continue the session establishment after successful creation of the temporary user subscription.

The charging system 404 comprises a temporary user subscription generator 412 configured to create a temporary user subscription for the roaming mobile terminal subscriber and to set an account balance for the temporary user subscription allowing the subscriber to use services attached to the temporary user subscription while roaming in the packet data based mobile communication network.

Figure 5:
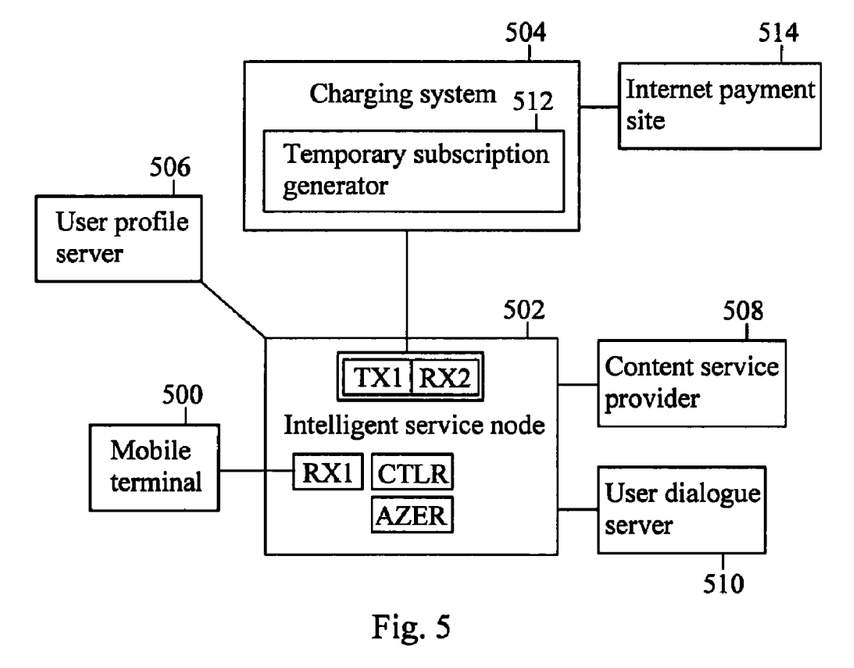
FIG. 5 discloses another embodiment of a system according to the invention.

FIG. 5 discloses another embodiment of a system according to the invention. The system comprises a packet-data-based mobile communication network comprising a mobile terminal 500 that requests service from a content service provider 508 via an intelligent service node 502. The intelligent service node 502 refers e.g. to a Gateway GPRS Support Node that implements the functionality of the invention.

In the system disclosed in FIG. 5, a user has accessed an Internet payment site 514 provided by one of the operators in that particular country in which the mobile terminal 500 is now roaming. The user provides the Internet payment site 514 with adequate amount of information (e.g. credit card number, the amount, user information etc.) The Internet payment site 514 charges the user and provides a charging system 504 of the mobile communication network with user payment information (e.g. the charged amount, user information, etc.). Based on the user payment information a temporary user subscription generator 512 of the charging system 504 creates a temporary account for the user, sets the account balance based on the already charged amount allowing the subscriber to use services attached to the temporary user subscription while roaming in the packet data based mobile communication network.

The intelligent service node 502 comprises a first receiver RX1 configured to receive a session establishment request from the mobile terminal 500 and an analyzer AZER configured to identify that the session establishment request comes from a subscriber for which a temporary user subscription has already been created. The identification may be made e.g. based on the request coming from the subscriber. In another embodiment, the intelligent service node 502 may send a request to the charging system 504 in order to make the identification. The intelligent service node 502 further comprises a first transmitter TX1 configured to send a request for the created temporary user subscription to the charging system 504, a second receiver RX2 configured to receive subscription information from the temporary user subscription generator, and a controller CTLR configured to apply the created temporary user subscription for the roaming subscriber.

The above-mentioned means in the network elements may be implemented e.g. by using software, hardware or both. For example, network elements disclosed in the invention may comprise a single memory or memory area or to a plurality of memories or memory areas that may include e.g. random access memories (RAM), read-only memories (ROM) etc. The memory or memories also include other applications or software components that are not described in more detail and also may include the computer program (or portion thereof), which when executed on a central processing unit performs at least some of the steps disclosed in the invention. The central processing unit may also include memory or a memory may be associated therewith which may include the computer program (or portion thereof) which when executed on central processing unit performs at least some of the steps disclosed in the invention.

It is obvious to a person skilled in the art that with the advancement of technology, the basic idea of the invention may be implemented in various ways. The invention and its embodiments are thus not limited to the examples described above; instead they may vary within the scope of the claims.

Thus it is seen that the foregoing description has provided by way of exemplary and non-limiting examples a full and informative description of the best methods and apparatus presently contemplated by the inventors for charging a subscriber roaming in a mobile communication network. One skilled in the art will appreciate that the various embodiments described herein can be practiced individually; in combination with one or more other embodiments described herein; or in combination with interactive graphical user interfaces differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

I claim:

1. A method comprising:
   determining, by a wireless network comprising at least a service node, that a mobile terminal requesting a service is roaming and that the wireless network has no user profile for the roaming mobile terminal;
   in response to the determining, the service node facilitating establishment of a temporary account in the wireless network for the roaming mobile terminal independent of a home network of the roaming mobile terminal, in which the temporary account comprises at least charging information; and
   the service node utilizing the established temporary account when providing the roaming mobile terminal access to a provider of the requested service,
   and further comprising:
   in response to determining that the wireless network has no user profile for the roaming mobile terminal, utilizing a default user profile for the roaming mobile terminal which defines services which are available for the mobile terminal and charging for the available services, and wherein:
   the service is requested in session establishment signaling and the service node holds the requested session until at least the temporary account is established; and
   the service is requested via a packet data protocol context activation.

2. The method according to claim 1, in which the temporary account further comprises at least one of: a credit limit; a prepaid voucher limit; and a balance for a pre-existing account at an Internet portal.

3. The method according to claim 1, in which the charging information comprises at least one of a credit card number and prepaid voucher information; and facilitating establishment of the temporary account comprises the wireless network obtaining at least the said at least one of the credit card number and the voucher information from the mobile terminal.

4. The method according to claim 1, in which facilitating establishment of the temporary account comprises the wireless network obtaining user payment information from an Internet portal with which the mobile terminal has a pre-existing account.

5. The method according to claim 4, further comprising, prior to providing the roaming mobile terminal access to the provider of the requested service, the wireless network determining from the Internet portal that the mobile terminal requires price indication and conditioning providing the roaming mobile terminal access to the provider of the requested service on the mobile terminal accepting the price indication.

6. The method according to claim 1, in which the establishment of the temporary account is facilitated in response to the determining only if the service which the mobile terminal requests is among the defined services of the default user profile which are available for the mobile terminal.

7. The method according to claim 1, in which the service node comprises a gateway support node and the wireless network further comprises a user profile server and a charging system;
   in which the gateway support node determines from the user profile server that the wireless network has no user profile for the roaming mobile terminal and the charging system creates the temporary account and provides the created temporary account to the gateway support node.

8. An apparatus comprising:
   at least one data processor;
   a non-transitory computer readable medium on which is stored a executable computer program;
   in which the non-transitory computer readable medium and the executable computer program are configured with the at least one data processor to cause the apparatus at least to:

determine that a mobile terminal requesting a service is roaming and that a wireless network which comprises the apparatus has no user profile for the roaming mobile terminal;

in response to the determining, facilitate establishment of a temporary account in the wireless network for the roaming mobile terminal independent of a home network of the roaming mobile terminal, in which the temporary account comprises at least charging information; and utilize the established temporary account when providing the roaming mobile terminal access to a provider of the requested service, wherein the non-transitory computer readable medium and the executable computer program are configured with the at least one data processor to cause the apparatus at least to further:

in response to determining that the wireless network has no user profile for the roaming mobile terminal, utilize a default user profile for the roaming mobile terminal which defines services which are available for the mobile terminal and charging for the available services, and wherein:

the service is requested in session establishment signaling and the apparatus is configured to hold the requested session until at least the temporary account is established; and the service is requested via a packet data protocol context activation.

9. The apparatus according to claim 8, in which the temporary account further comprises at least one of: a credit limit; a prepaid voucher limit; and a balance for a pre-existing account at an Internet portal.

10. The apparatus according to claim 8, in which the charging information comprises at least one of a credit card number and prepaid voucher information; and the non-transitory computer readable medium and the executable computer program are configured with the at least one data processor to cause the apparatus to facilitate the establishment of the temporary account by obtaining the said at least one of the credit card number and the prepaid voucher information from the mobile terminal.

11. The apparatus according to claim 10, in which the non-transitory computer readable medium and the executable computer program are configured with the at least one data processor to cause the apparatus to facilitate the establishment of the temporary account by obtaining user payment information from an Internet portal with which the mobile terminal has a pre-existing account.

12. The apparatus according to claim 11, in which the non-transitory computer readable medium and the executable computer program are configured with the at least one data processor to cause the apparatus at least to further:

prior to providing the roaming mobile terminal access to the provider of the requested service, determine from the Internet portal that the mobile terminal requires price indication and to condition providing the roaming mobile terminal access to the provider of the requested service on the mobile terminal accepting the price indication.

13. The apparatus according to claim 8, in which the non-transitory computer readable medium and the executable computer program are configured with the at least one data processor to cause the apparatus to facilitate the establishment of the temporary account in response to the determining only if the service which the mobile terminal requests is among the defined services of the default user profile which are available for the mobile terminal.

14. The apparatus according to claim 8, in which the apparatus comprises a gateway support node and the non-transitory computer readable medium and the executable computer program are configured with the at least one data processor to cause the apparatus to determine from a user profile server that the wireless network has no user profile for the roaming mobile terminal and to obtain from the charging system the temporary account which the charging system creates.

15. A non-transitory computer readable medium on which is stored a executable computer program, the executable computer program comprising:

code adapted to determine that a mobile terminal requesting a service through a wireless network is roaming and that the wireless network has no user profile for the roaming mobile terminal;

code adapted to facilitate establishment of a temporary account in the wireless network for the roaming mobile terminal independent of a home network of the roaming mobile terminal in response to the determining, in which the temporary account comprises at least charging information; and code adapted to utilize the established temporary account when providing the roaming mobile terminal access to a provider of the requested service, the executable computer program further comprising:

code, which is executable in response to determining that the wireless network has no user profile for the roaming mobile terminal, adapted to utilize a default user profile for the roaming mobile terminal which defines services which are available for the mobile terminal and charging for the available services, and wherein:

the service is requested in session establishment signaling and the apparatus is configured to hold the requested session until at least the temporary account is established; and the service is requested via a packet data protocol context activation.

* * * * *